US009347917B2

(12) United States Patent
Campbell et al.

(10) Patent No.: US 9,347,917 B2
(45) Date of Patent: May 24, 2016

(54) MASS SPECTROMETRY SYSTEMS AND METHODS FOR ANALYSES ON LIPID AND OTHER IONS USING A UNIQUE WORKFLOW

(71) Applicants: DH Technolgies Development Pte. Ltd., Singapore (SG); University of Wollongong, New South Wales (AU)

(72) Inventors: John Lawrence Campbell, Milton, CA (US); Eva Duchoslav, Toronto (CA); Stephen Blanksby, New South Wales (AU); Todd Mitchell, New South Wales (AU)

(73) Assignee: DH Technologies Development Pte. Ltd., Singapore (SG)

( * ) Notice: Subject to any disclaimer, the term of this patent is extended or adjusted under 35 U.S.C. 154(b) by 8 days.

(21) Appl. No.: 14/388,309

(22) PCT Filed: Mar. 28, 2013

(86) PCT No.: PCT/IB2013/000563

§ 371 (c)(1),
(2) Date: Sep. 26, 2014

(87) PCT Pub. No.: WO2013/144708

PCT Pub. Date: Oct. 3, 2013

(65) Prior Publication Data

US 2015/0346152 A1 Dec. 3, 2015

Related U.S. Application Data

(60) Provisional application No. 61/616,755, filed on Mar. 28, 2012.

(51) Int. Cl.
*G01N 27/62* (2006.01)
*H01J 49/04* (2006.01)
*H01J 49/00* (2006.01)

(52) U.S. Cl.
CPC .............. *G01N 27/62* (2013.01); *H01J 49/005* (2013.01); *H01J 49/0031* (2013.01)

(58) Field of Classification Search
CPC ... H01J 49/0045; H01J 49/063; H01J 49/005; H01J 49/4225; H01J 49/004; H01J 49/0072; H01J 49/026; H01J 49/0031; H01J 49/04; H01J 49/0404; H01J 49/0468; H01J 49/165; H01J 49/4215; H01J 49/423; H01J 49/424; H01J 49/425; G01N 27/624; G01N 27/622; G01N 27/6818; G01N 27/6848
USPC ......... 250/282, 288, 281, 287, 292, 283, 286, 250/290, 291, 299, 300, 423 R
See application file for complete search history.

(56) References Cited

U.S. PATENT DOCUMENTS 6,225,623 B1 * 5/2001 Turner ................. G01N 27/622 250/286
6,781,136 B1 * 8/2004 Kato ......................... H01J 1/30 250/324

(Continued)

OTHER PUBLICATIONS

International Search Report from International Patent Application No. PCT/IB2013/000563, dated Aug. 12, 2013.

*Primary Examiner* — David A Vanore

(57) ABSTRACT

The applicants' teachings provide in some aspects methods and apparatus for mass spectrometric analysis that identify the location of carbon-carbon double bonds, if any, in an analyte by (1) obtaining the m/z ratio of the intact analyte ions, (2) subjecting these ions to collision-induced dissociation and (3) determining relationships between masses and/or mass-to-charge ratios of the intact analyte ions and the fragments produced by such collision-induced dissociation. The methods and apparatus selectively subject analyte ions to ozone-induced dissociation based on those relationships and determine location(s) of carbon-carbon double bonds, if any, from reaction products of ozone-induced dissociation.

17 Claims, 2 Drawing Sheets

(56) References Cited

U.S. PATENT DOCUMENTS

Figure 1:
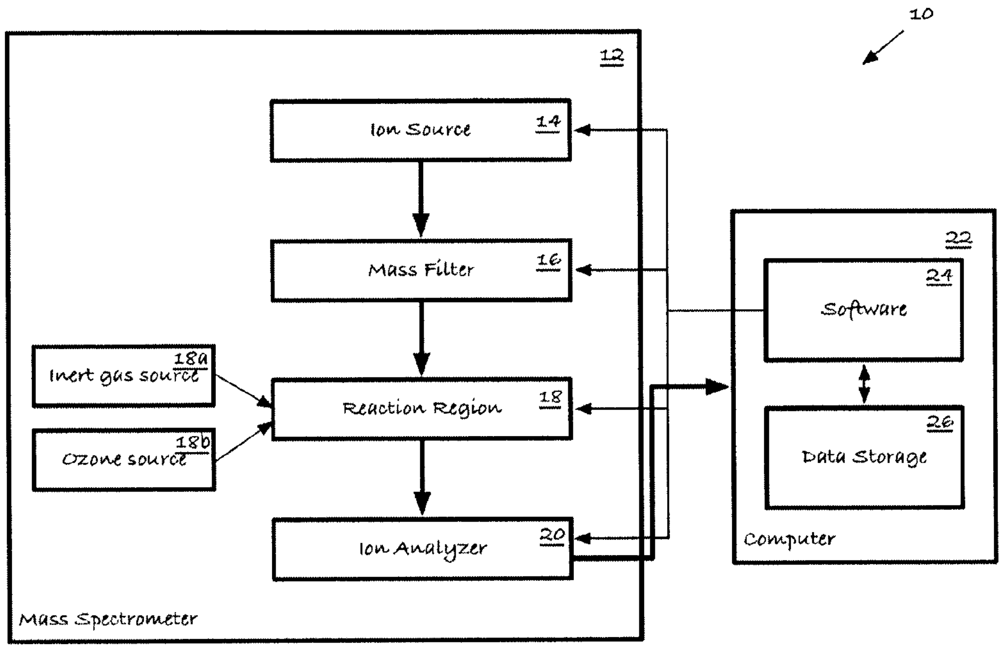

| | | | | |
|---|---|---|---|---|
| 6,872,938 | B2 * | 3/2005 | Makarov | B82Y 30/00 250/281 |
| 6,963,807 | B2 * | 11/2005 | Townsend | G01N 33/6818 436/173 |
| 7,592,604 | B2 * | 9/2009 | Koike | H01J 37/02 250/306 |
| 7,771,943 | B2 | 8/2010 | Blanksby et al. | |
| 7,776,916 | B2 * | 8/2010 | Freeman | A61K 31/21 514/178 |
| 2004/0079879 | A1 * | 4/2004 | Ross | H01J 49/168 250/287 |
| 2005/0277789 | A1 * | 12/2005 | Bloomfield | H01J 49/063 564/4 |
| 2005/0279932 | A1 * | 12/2005 | Wang | H01J 49/424 250/290 |
| 2006/0249672 | A1 * | 11/2006 | Grimm | H01J 49/165 250/288 |
| 2007/0085000 | A1 * | 4/2007 | Furuhashi | H01J 27/026 250/288 |
| 2007/0138383 | A1 * | 6/2007 | Dowell | H01J 49/0072 250/281 |
| 2008/0164409 | A1 * | 7/2008 | Schultz | G01N 27/622 250/282 |
| 2008/0191145 | A1 * | 8/2008 | Lee | A61L 9/22 250/423 R |
| 2008/0296486 | A1 * | 12/2008 | Blanksby | H01J 49/0045 250/282 |
| 2009/0101165 | A1 * | 4/2009 | Mueller | G01V 9/007 134/2 |
| 2010/0176291 | A1 * | 7/2010 | Hager | H01J 49/004 250/283 |
| 2011/0042561 | A1 * | 2/2011 | Miller | G01N 27/624 250/282 |
| 2012/0025070 | A1 * | 2/2012 | Miller | G01N 27/624 250/287 |
| 2014/0353490 | A1 * | 12/2014 | Tate | H01J 49/0031 250/282 |
| 2015/0260684 | A1 * | 9/2015 | Blanksby | G01N 27/622 250/288 |

* cited by examiner

MASS SPECTROMETRY SYSTEMS AND METHODS FOR ANALYSES ON LIPID AND OTHER IONS USING A UNIQUE WORKFLOW

RELATED APPLICATION

This application claims priority to U.S. provisional application No. 61/616,755 filed Mar. 28, 2012, which is incorporated herein by reference in its entirety.

INTRODUCTION

The applicants' teachings pertain to analytical chemistry including mass spectrometry methods and apparatus.

The number of and exact location of carbon-carbon double bonds (CCDBs) within a molecule (e.g., lipids such as fatty acids, triacylglycerols, etc.) can be of great importance to understanding the chemical reactivity of such molecules. In some cases, such lipids are metabolites from human or animal subjects, and the identification of CCDB number and position is essential as a diagnostic tool in health care. In other cases, lipids are present in modern biofuels, and the presence of CCDBs can affect combustion efficiency and processing parameters.

The unambiguous identification of CCDB number and location in a molecule can be performed by using mass spectrometry, specifically a technique known as ozone-induced dissociation (OzID), which uses the well-established reaction of ozone with CCDBs to cleave these functionalities in a specific, characteristic manner. However, the general use of OzID requires manual intervention and a priori knowledge regarding the presence of CCDBs in an analytical sample. Accordingly, there remains a need for improved methods and systems for identifying CCDBs in analytes, while simultaneously characterizing the remainder of the structural features of these analytes by using other techniques of mass spectrometric analysis.

SUMMARY

The foregoing are among the objects attained by the applicants' teachings, which provide, in some aspects, methods and apparatus for mass spectrometry analysis that identify the location of carbon-carbon double bonds (CCDBs), if any, in an analyte by (1) subjecting its ions to collision-induced dissociation (CID) and (2) determining relationships between the ions and/or fragments produced by such CID. The methods and apparatus selectively subject analyte ions to ozone-induced dissociation (OzID) based on those relationships and determine the number and/or location(s) of CCDBs, if any, from reaction products of OzID.

Related aspects of the applicants' teachings provide such methods and apparatus that determine the masses of charged or neutral fragments (so called neutral losses) resulting from CID and that utilize those masses in the determination of whether to subject analyte ions to OzID.

Further aspects of the applicants' teachings are set forth in the claims attached hereto.

Methods and apparatus according to the applicants' teachings are advantageous, among other reasons, in that they make possible the mass spectrometric analysis, e.g., of lipids, petrochemicals, and polymers (among other compounds), including the determining the number and/or location(s) of CCDBs therein, on time-scales typically associated with liquid chromatography.

These and other features of the applicants' teachings are set forth herein.

DRAWINGS

Figure 2:
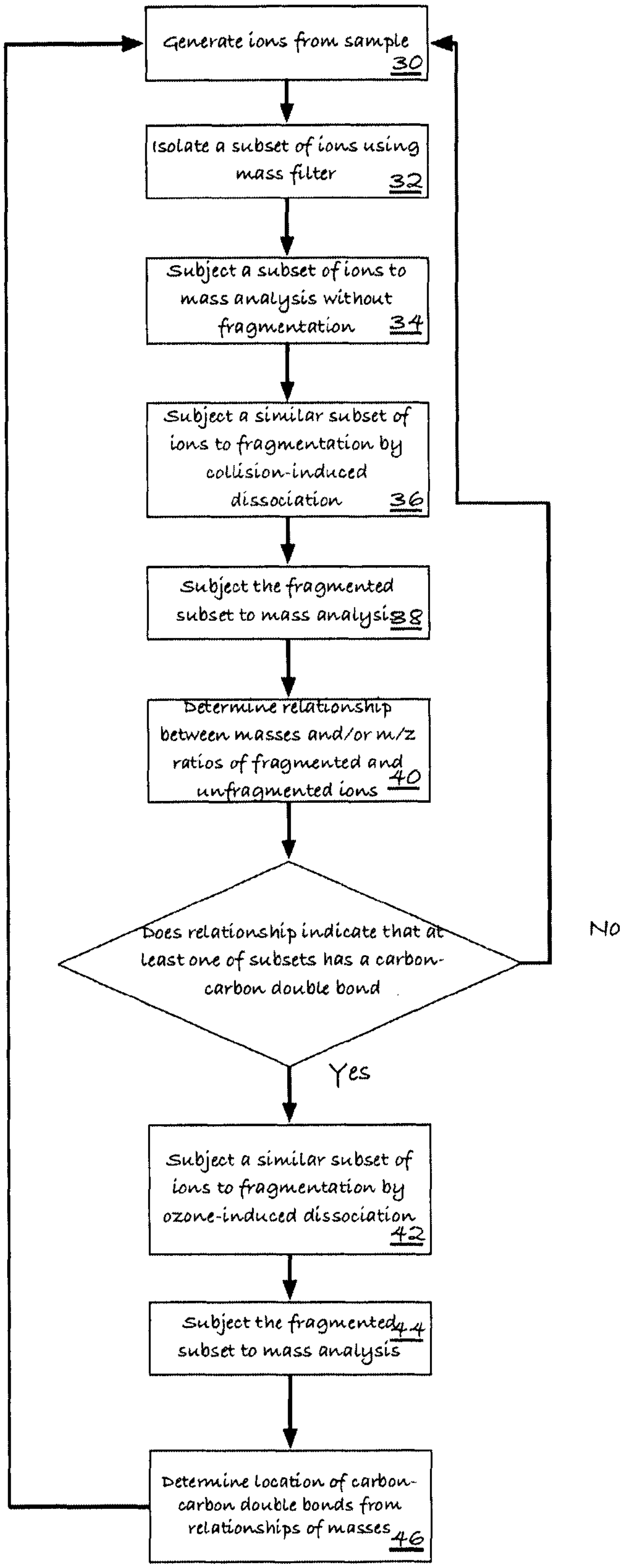

The skilled person in the art will understand that the drawings, described below, are for illustration purposes only. The drawings are not intended to limit the scope of the applicant's teachings in any way:

FIG. 1 depicts an exemplary mass spectrometry system in accordance with various aspects of the applicants' teachings; and FIG. 2 depicts an exemplary workflow in accordance with various aspects of the applicants' teachings affected by the mass spectrometry system of FIG. 1.

DESCRIPTION OF VARIOUS EMBODIMENTS

Referring to FIG. 1, illustrated therein is a mass spectrometry system 10 in accordance with some practices the applicants' teachings suitable for information dependent acquisition (IDA). The system 10 includes mass spectrometer 12—itself comprising an ion source 14, a mass filter 16, a reaction region 18, and an ion analyzer 20 that are coupled to form a flow-path for the processing and analysis of ions in accord with the teachings hereof. The system further includes a digital data processor 22 that is electronically coupled with the spectrometer 12 and that includes software 24 and data storage unit 26.

Although the spectrometer 12 and computer 22 are each shown, here, as a separate units housing respective constituent components, in some embodiments those components may be housed otherwise. Thus, for example, the computer 22 (or one or more components thereof) may be housed with the spectrometer 12, one or more components of the spectrometer may comprise stand-alone equipment, and so forth all by way of example. For these reasons, among others, the terms "apparatus" and "systems" are used interchangeably herein.

The ion source 14 is configured to emit ions generated from the analyte or sample (not shown) to be analyzed. The ion source 14 is constructed and operated (e.g., by a human operator, computer 22, and/or otherwise) in the conventional manner known in the art of mass spectrometry, as adapted in accord with the teachings hereof. The ion source 14 can include, but is not limited to, a continuous ion source, such as an electron impact (EI), chemical ionization (CI), or field desorption-ionization (FD/I) ion sources (which may be used in conjunction with a gas chromatography source); an electrospray (ESI) or atmospheric pressure chemical ionization (APCI) ion source (which may be used in conjunction with a liquid chromatography source); a desorption electrospray ionization (DESI); or a laser desorption ionization source such as a matrix assisted laser desorption ionization (MALDI), laser desorption-ionization (LDI) or laserspray (which typically utilizes a series of pulses to emit a pulsed beam of ions).

Ions generated by the ion source 14 are transmitted to mass filter 16, which is configured to select (or filter) a subset of ions within a chosen mass-to-charge ratio range and/or based on intensity of the analyte ions for transmission into the reaction region 18. The mass filter is constructed and operated (e.g., by a human operator, computer 22, and/or otherwise) in the conventional manner known in the art, as adapted in accord with the teachings hereof. The mass filter 16 can include, but is not limited to, a quadrupole mass filter, an ion trapping device (such as a 3D or 2D quadrupole ion trap, a C-trap, or an electrostatic ion trap), all by way of example.

Ions emitted by the mass filter 16 are admitted into the region 18 for reaction with a reagent gas or gas mixture under a prescribed pressure. The mass filter 16 is constructed and operated (e.g., by a human operator, computer 22, and/or otherwise) in the conventional manner known in the art, as adapted in accord with the teachings hereof. It can be injected from source 18*a* with an inert reagent gas of the type known in the art that is typically used in collision-induced dissociation (CID) reactions, e.g., helium, neon, nitrogen, argon, xenon, or air, by way of non-limiting example, and/or, from source 18*b*, with ozone so as to form a mixture with the inert gas. The reaction region 18 can include, but is not limited to, a quadrupole mass filter, an ion trapping device (such as a 3D or 2D quadrupole ion trap, a C-trap, or an electrostatic ion trap), all by way of example. Injection of the region 18 from sources 18*a*, 18*b* can be controlled by computer 22 and/or by an operator in the conventional manner known in the art, as adapted in accord with the teachings hereof.

Ions admitted to the reaction region 18 may pass through the region without incurring any structural fragmentation, or they may fragment as a result of collision with atoms/molecules of the gas mixture present in the region 18 and/or as a result of dissociation (e.g., under the influence of ozone). Some or all or the ions may be trapped for a period of time in the region before passing through.

The ion analyzer 20 is positioned downstream of the ion source 14 and the reaction region 18 in the path of the ions emitted from reaction region 18. Analyzer 20, which may include a detector (not shown) separates the emitted ions and fragments as a function of mass-to-charge ratio (m/z) and generates an output representative of the number of ions at each m/z value. The ion analyzer 20 (and constituent detector) is constructed and operated (e.g., by a human operator, computer 22, and/or otherwise) in the conventional manner known in the art, as adapted in accord with the teachings hereof. The ion analyzer 20 can include, but is not limited to, a quadrupole mass filter, an ion trapping device (such as a 3D or 2D quadrupole ion trap, a C-trap, or an electrostatic ion trap), an ion cyclotron resonance trap, an Orbitrap, or a time-of-flight mass spectrometer, all by way of example.

Components 14-20 of the mass spectrometer 12 are coupled by tubing, valves and other apparatus of the type conventionally used in the art to form an flow path suitable for passage and analysis of ions generated by source 14 in accord with the teachings hereof.

Computer 22 comprises a general- or special-purpose digital data processor (stand-alone, embedded or otherwise) of the type known in the art suitable for controlling and/or providing an interface to the mass spectrometer 12, all in the conventional manner known in the art, as adapted in accord with the teachings hereof. Thus, for example, software 24 executes on computer 22 in order to facilitate and/or effect operation of the mass spectrometer 12 using information or information-dependent acquisition consistent with the teachings hereof, and data storage 26 retains mass-to-charge data output by analyzer 20 and/or data (e.g., tables of specific neutral losses from lipid ions that are known to contain CCDBs) utilized for identification of samples appropriate for OzID-based analysis.

To this end, the computer 22 and/or the operator effect operation of the mass spectrometer 12 (and, more generally, of the system 10) in accord with the workflow shown in FIG. 2 in order to (1) identify samples that contain at least one CCDB and (2) determine the location of those bonds. By way of overview, the workflow includes utilizing the mass spectrometer 12 to perform mass analysis on intact (i.e., unfragmented) ions produced from the sample to obtain its molecular weight and fragments produced by collision-induced dissociation of such ions to determine their masses (or mass-to-charge ratios), as well those of any neutral losses resulting from the CID reaction. Depending on the relationships of the masses determined by those analyses, the spectrometer 12 is utilized for OzID of analyte ions, the mass of the fragments resulting from are used to determine the location of CCDBs in the analyte molecule.

Referring to the drawing, the ion source 14 is used to generate ions from an analyte. Step 30.

Mass filter 16 can then be used to isolate a subset of those ions to simplify the analysis. This subset can contain a single analyte ion (one m/z value—e.g., m/z 100+/−0.5) or, if the mass filter is configured to permit passage of the full range of ions (or, alternatively, the mass filter is not applied), can contain a window of ions (e.g., m/z 100+/−20). Step 32.

Those ions are transmitted through the mass spectrometer, including the reaction region 18, and are detected by the ion analyzer without any modification, reactions, or fragmentation. Step 34. This yields information on the intact molecular masses of the chosen analyte ions.

In a subsequent analysis, the reaction region 18, which is filled with the inert target gas (e.g., nitrogen, argon) from a suitable source (see element 18*a*, FIG. 1) and ions from the same or related one or more subsets (e.g., a user-selected subset that may need more detailed screening for CCDB presence) are sampled from the ion source 14 and are accelerated into that region 18, such that they collide with the inert target gas). See step 36. These ions undergo CID and produce a series of fragmentation products, which are analyzed by the ion analyzer. See step 38.

The software 24 then compares the mass spectrum of the intact analyte ions (from steps 30-34) with the mass spectrum of the CID fragments of those ions (from steps 36-38) and determines whether there is a relationship between intact and fragmented ions that would indicate presence of one or more CCDBs. The relationship may be based on a specific mass difference between any of the fragment ions and the intact analyte ions or on a specific CID fragment ion. The software determines the presence of CCDB based either on lookup tables or using internal fragment and/or neutral loss prediction algorithms. The software 24 can also predict ab initio the presence of CCDBs in a charged or neutral loss fragment using exact mass calculations. See step 40. (In such cases, the fragmentation step can be of value, for example, in collecting complementary CID information for the species.)

If one or more of these CCDBs is identified when the first and second mass spectra are compared, a third consecutive analysis on the same subset of analyte ions is initiated—an OzID experiment. The purpose of the OzID experiment is to identify unequivocally the position of the CCDB(s) in an analyte ion.

Here, ozone is injected into the reaction region 18 from a suitable source (see element 18*b*, FIG. 1) to form a mix with the inert target gas (e.g., nitrogen, argon), and ions from the same subset are sampled from the ion source 14 and are trapped within the region 18 for a period of time suitable for OzID. See step 42. During this time, the subset of ions will react with the ozone present in the reaction region 18, and any CCDBs will be cleaved. Here, again, the reaction products are analyzed by the ion analyzer 20. See step 44.

Post-acquisition, the software 24 compares the mass spectrum of the OzID fragments (from steps 42-44) with that of the intact analyte ions (from steps 30-34) to determine the exact position(s) of any CCDBs. See step 46. The software can utilize the mass spectrum of the CID fragments of those ions (from steps 36-38) for general structure elucidation, for example, identification of the lipid class by the headgroup fragments present.

In some embodiments, steps 30-46 are performed in real-time, i.e., in a rapid succession within the operational bounds of the spectrometer 12. This compares favorably with conventional techniques for CCDB localization and, as such, represents a unique research tool not equaled in the art.

In some embodiments, the OzID ion/molecule reactions, e.g., conducted in a q2 region of a QTRAP® mass spectrometer maintained at a high pressure (e.g., about 1 mTorr), can generate intact adduct ions $[M+O_3]^{+/-}$, where M denotes an analyte ion. By way of example, in some embodiments, such intact adduct ion can include the intact adduct of a lipid ion with a neutral ozone molecule. In some embodiments, a supplemental activation energy can be provided to such intact adduct ions so as to cause them to fragment into ozonolysis products, thereby increasing the yield of the OzID reaction. This can in turn increase the speed and sensitivity of the analysis. For example, in some embodiment in which such supplemental activation is employed, shorter ion/molecule reaction times are required to produce equivalent levels of diagnostic OzID product ions, and these products ions can have greater intensities given the dissociation of the intact residual adduct ions.

Supplemental activation of the intact adduct ions can be achieved in a variety of different ways. For example, the intact adduct ions can be subjected to an acceleration potential (typically a small acceleration potential, e.g., 15 volts). By way of example, in some embodiments, such an acceleration potential can be applied to the intact adduct ions between the q2 and Q3 regions of a QTRAP® mass spectrometer. In some other embodiments, the intact adduct ions can be subjected to resonant dipolar excitation, e.g., in a Q3 region of a QTRAP® mass spectrometer.

Described above are systems and methods meeting the objects set forth earlier, among others. It will be appreciated that the embodiments shown in the drawing and discussed above are merely examples and that other embodiments incorporating changes thereto fall within the scope of the applicants' teachings, of which we claim.

In view of the foregoing, what we claim is:

1. A method for mass analysis comprising:

generating ions of an analyte using an ion source;

selecting a subset of ions received from the ion source with a mass filter that is coupled in an ion flow path;

transmitting the subset of ions through a reaction region that is coupled in an ion flow path with the mass filter and that is filled with any of an inert gas that is used to induce collision-induced dissociation of ions received from the mass filter and ozone that is used to induce ozone-induced dissociation of such ions;

detecting the subset of ions using an ion analyzer that is coupled in an ion flow path with the reaction region and that separates any of ions and fragments received from the reaction region as a function of mass-to-charge ratio (m/z) and that generates an output representing a spectrum thereof; and employing the ion source, mass filter, reaction region and ion analyzer to identify the location of carbon-carbon double bonds, if any, in the analyte by (1) subjecting ions of the analyte generated by the ion source to mass analysis without any fragmentation or reaction, (2) subjecting ions of the analyte generated by the ion source to collision-induced dissociation in the reaction region, (3) determining relationships between masses and/or mass-to-charge ratios of the ions and/or fragments produced by such collision-induced dissociation, (4) selectively subjecting, based on those relationships, ions generated by the ion source to ozone-induced dissociation in the reaction region, and (5) determining the location(s) of carbon-carbon double bonds, if any, from reaction products of such ozone-induced dissociation.

2. The method of claim 1, wherein the mass filter comprises any of a quadrupole mass spectrometer and an ion trapping device.

3. The method of claim 1, wherein the mass filter selects a said subset from within a predetermined mass-to-charge ratio range.

4. The method of claim 1, wherein a gas mixture is formed comprising ozone and the inert gas for performing collision-induced dissociation.

5. The method of claim 4, wherein the the inert gas comprises one of helium, neon, nitrogen, argon, xenon, and air.

6. The method of claim 1, wherein the ion source, mass filter, reaction region and ion analyzer operate such that analyte ions within a range of mass-to-charge values are transmitted through the reaction region without undergoing fragmentation or reaction and are extracted to the ion analyzer.

7. The method of claim 1, wherein the ion source, mass filter, reaction region and ion analyzer operate such that analyte ions within the range of mass-to-charge values are transmitted through the reaction region such that the analyte ions are subjected to collisions with the gas mixture to affect collision-induced dissociation of the analyte ions.

8. The method of claim 7, wherein the ion source, mass filter, reaction region and ion analyzer operate such that ions within the reaction region are extracted from the reaction region, with the ion detector detecting the ions of the analyte of interest after they have undergone collisions in the reactive region, wherein a mass-to-charge ratio of the ions of the analyte of interest is determined from the ion analyzer.

9. The method of claim 8, wherein the mass spectrum of the intact analyte ions is compared with the mass spectrum of the collision-induced fragments to determine a specific mass difference between any of the fragment ions and the intact analyte ions or on a specific collision-induced fragment ion to indicate the presence of one or more carbon-carbon double bonds.

10. The method of claim 9, wherein the ion source, mass filter, reaction region and ion analyzer operate such that the analyte ions identified as containing at least one carbon-carbon double bond are transmitted by the mass filter substantially separating analyte ions in a range of mass-to-charge ratio values.

11. The method in claim 10, wherein the ion source, mass filter, reaction region and ion analyzer operate such that the identified analyte ions transmitted by the mass filter are trapped in the reaction region for a period of time wherein the analyte ions undergo a reaction with ozone.

12. The method of claim 11, wherein the ion source, mass filter, reaction region and ion analyzer operate such that all ions contained in the reaction region are extracted from the reaction region after a period of time, with the ion detector detecting the ions of the analyte of interest after they have undergone collisions in the reactive region, wherein a mass-to-charge ratio of the ions of the analyte of interest is determined from the ion analyzer.

13. An apparatus for mass analysis comprising:

an ion source to generate ions of an analyte;

a mass filter that is coupled in an ion flow path with the ion source to select a subset of ions received from the ion source;

a reaction region that is coupled in an ion flow path with the mass filter and that is filled with any of an inert gas that is used to induce collision-induced dissociation of ions received from the mass filter and ozone that is used to induce ozone-induced dissociation of such ions;

an ion analyzer that is coupled in an ion flow path with the reaction region and that separates any of ions and fragments received from the reaction region as a function of mass-to-charge ratio (m/z) and that generates an output representing a spectrum thereof;

the ion source, mass filter, reaction region and ion analyzer operate to identify the location of carbon-carbon double bonds, if any, in the analyte by (1) subjecting ions of the analyte generated by the ion source to mass analysis without any fragmentation or reaction, (2) subjecting ions of the analyte generated by the ion source to collision-induced dissociation in the reaction region, (3) determining relationships between masses and/or mass-to-charge ratios of the ions and/or fragments produced by such collision-induced dissociation, (4) selectively subjecting, based on those relationships, ions generated by the ion source to ozone-induced dissociation in the reaction region, and (5) determining the location(s) of carbon-carbon double bonds, if any, from reaction products of such ozone-induced dissociation.

14. The apparatus of claim 13, wherein the mass filter comprises any of a quadrupole mass spectrometer and an ion trapping device.

15. The apparatus of claim 13, wherein the mass filter selects a said subset from within a predetermined mass-to-charge ratio range.

16. The apparatus of claim 13, wherein a gas mixture is formed comprising ozone and the inert gas for performing collision-induced dissociation.

17. The apparatus of claim 16, wherein the inert gas comprises one of helium, neon, nitrogen, argon, xenon, and air.

* * * * *